US007006977B1

(12) United States Patent  
Attra et al.

(10) Patent No.: US 7,006,977 B1  
(45) Date of Patent: Feb. 28, 2006

(54) SYSTEM FOR AUTOMATING AND IMPROVING HOME DESIGN AND CONSTRUCTION

(76) Inventors: Cory Attra, 17 Lords Hwy., Weston, CT (US) 06883; Marc Pritchard, 4738 Cache Peak Dr., Antioch, CA (US) 94509

(*) Notice: Subject to any disclaimer, the term of this patent is extended or adjusted under 35 U.S.C. 154(b) by 453 days.

(21) Appl. No.: 09/497,554

(22) Filed: Feb. 3, 2000

(51) Int. Cl.  
*G06F 17/60* (2006.01)

(52) U.S. Cl. .......................................... 705/1; 705/26

(58) Field of Classification Search ............... 705/1, 705/26  
See application file for complete search history.

(56) References Cited

U.S. PATENT DOCUMENTS 5,950,206 A * 9/1999 Krause .................... 707/104.1

FOREIGN PATENT DOCUMENTS

JP 411237000 A * 8/1999

OTHER PUBLICATIONS

Information on residential design provider Collective Designs (www.collectivedesigns.com) printed through "www.archive.org".*
Information on building supply provider ChooChoo Build-It Mart (www.choochoobuilditmart.com) printed through "www.archive.org".*
Gwen Lowery, "Managing Projectgs with Microsoft Project 4.0 for Windows ™ and Macintosh ®", 1994, Van Nostrand Reinhold.*
Project Management Basics downloaded from elmo.shore.ctc.edu/jbaker/Ba195c7.ppt.*
Information on Collective Designs, 1999-2002.*
Information on Choo-Choo Buile-It Mart, 1999.*
Informationon APmatics, 1999-2001.*
Gwen Lowery, "Managing Projects with Microsoft Project 4.0", 1994.*
Project Management Basics, date unknown, presented to applicant with office action dated Jun. 13, 2002 mailed on Jun 21, 2002.*
Ralph Grabowski, "Visio Technical 5.0 Plus Beta Preview", 1998 (date determined from review on p. 1).*
Tom Inglesy, Working With Numbers. Feb./Mar. 1999.*
Information on PlansPDQ, 1999.*
Various authors of emails, Bill Of Material Posing, 1999.*
REALTRAC Announces Enhanced Bill Of Material Function, Sep. 10, 1999.*

* cited by examiner

*Primary Examiner*—Naresh Vig  
(74) *Attorney, Agent, or Firm*—St. Onge Steward Johnston & Reens LLC (57) ABSTRACT

A system for providing construction services is provided. The system includes a system computer having query routine software and calculation routine software executing thereon. Query routine software generates queries pertinent to the design of a home and transmits the queries through an internet communication link to a user computer. A user operating the user computer then views the queries, composes responses to the queries, and transmits the responses to the system computer through the internet communication link. Calculation routine software uses the query responses to calculate a home plan, perform work package calculations to generate a breakdown based on the home plan, and generate various other pertinent documents, such as a bankable estimate and an offer to build. These documents are transmitted back to the user computer through the internet communication link.

3 Claims, 10 Drawing Sheets

300
SYSTEM FOR AUTOMATING AND IMPROVING HOME DESIGN AND CONSTRUCTION

FIELD OF THE INVENTION

The present invention relates to a system which automates and improves home design and construction, and more particularly to an automated web-based system which reduces the time and cost required to conceive, plan and program, inventory and categorize supply for, design, budget and aggregate prices for, and produce documents and information essential for, the construction, remodeling, repair or reconstruction of a home.

BACKGROUND OF THE INVENTION

The conventional process by which the general public currently builds, remodels, repairs or reconstructs a home involves a sequence of logically related activities engaging the advice and assistance of various professional and technical experts such as consultants, designers, builders, developers, and realtors. There are many permutations to a common theme. Generally, these processes can be summarized in terms of five major events.

Conceptualize. The first step is to conceive a physical feature or aspect of a home that would satisfy one or more existing or future needs. For example, an avid swimmer might learn through casual conversation that it costs less to build a swimming pool than to join a private country club, or that it costs less to build a pool than he/she might have otherwise imagined. In either case, the person has conceptualized a swimming pool for his/her home.

Plan and Program. Planning has two parts. Part one is a process by which the feasibility of a person's concept is analyzed and determined. For example, a person might conceive the need for a swimming pool but, after close examination with a pool contractor, determine that the cost could be prohibitively higher than expected if the project involves blasting. Part two of planning is the process of determining the general activities, time frames, and approximate costs for potentially feasible concepts. Programming is the process of assigning these costs to activities and time frames associated with implementing the concept, thus calculating various financial scenarios.

Inventory and Categorize Supply. Under conventional practices, it is necessary to develop sufficient information about a plan in order to solicit and procure the services of professional designers, developers, and builders. The amount of information contained in the scope of work varies depending on how these services are to be packaged, but generally, it contains enough information with which a party can make a contractual offer. For example, the scope of work for a planned swimming pool might contain the location of the property, goal for the budget, and a listing of associated amenities such as a pool house and spa.

Design. A designer works with a homeowner to develop the planned concept into detailed drawings and specifications used to physically construct the planned concept in accordance with state and local codes. There are many processes used to design homes but the essence of home design is an iterative process that starts with a designer identifying the needs from which a concept was created. The designer then translates this information into plan drawings that theoretically satisfy the needs. The person studies the plans, perhaps engaging other family members or friends, and provides feedback to the designer. The designer then modifies the plans whereupon the person then studies the modified plans and so on. The process continues until the person is satisfied that the design meets his/her needs. With homes, the design process can be time consuming and costly because the designer is usually compelled to satisfy a wide and diverse range of needs.

Budget and Aggregate Prices. A designer normally calculates a plan budget, aggregating prices, with every iteration of the design process. This is normally done using one of two methods: (1) calculating aggregate cost estimates based on the designer's historical data such as price per square foot for garage; or (2) compiling detailed cost estimates using the drawings, specifications, and published data.

The financing of a home plan from a bank requires a "bankable" cost estimate. These can be generated in two ways: (1) soliciting and obtaining firm bid prices from builders and construction contractors based on design documents; or (2) compiling detailed cost estimates from professional cost estimators guaranteeing calculations.

Thus, remodeling, repairing or reconstructing a home has traditionally involved a sequence of logically related activities engaging the advice and assistance of various professional and technical experts such as consultants. Such an approach, with its repetitive revisions and recalculations, is time consuming and can be quite expensive. For example, the homeowner may desire numerous estimates to determine which various amenities to include in a home, which building materials to have used, etc. In such a case, the designer would have to perform numerous recalculations, for which the homeowner would have to pay.

What is desired, therefore, is a system which reduces the time and cost required to conceive, plan and program, inventory and categorize supply for, design, budget and aggregate prices for, and produce documents and information essential for, the construction, remodeling, repair or reconstruction of a home, which automates much of the labor required to conceive, plan and program, inventory and categorize supply for, design, budget and aggregate prices for, and produce documents and information essential for, the construction, remodeling, repair or reconstruction of a home, which allows homeowners to research and interact with consultants, designers, builders and contractors of homes, and which provides for automated and efficient management of the construction, remodeling, repair or reconstruction of a home.

SUMMARY OF THE INVENTION

Accordingly, it is an object of the present invention to provide a system which reduces the time and cost required to conceive, plan and program, inventory and categorize supply for, design, budget and aggregate prices for, and produce documents and information essential for, the construction, remodeling, repair or reconstruction of a home.

Another object of the present invention is to provide a system having the above characteristics and which automates much of the labor required to conceive, plan and program, inventory and categorize supply for, design, budget and aggregate prices for, and produce documents and information essential for, the construction, remodeling, repair or reconstruction of a home.

A further object of the present invention is to provide a system having the above characteristics and which allows the general public to research, learn about, analyze, evaluate, interview, select, and purchase the services of consultants, designers, builders, and contractors of homes.

Still another object of the present invention is to provide a system having the above characteristics and which allows homeowners and insurance carriers of homes to reduce the amount of time and cost required to repair or reconstruct a home that is damaged or destroyed.

Yet a further object of the present invention is to provide a system having the above characteristics and which provides for automated and efficient management of the construction, remodeling, repair or reconstruction of a home.

These and other objects of the present invention are achieved by provision of a system for providing construction services which includes a computer having software executing thereon for transmitting queries and for receiving responses to the transmitted queries. The system also includes software executing on the computer for generating a home plan based on the received responses to the transmitted queries and for performing work package calculations on the home plan to generate a breakdown. Software executing on the computer displays details of the home plan, receives requests for modification of the details of the home plan, and generates a modified home plan based upon the received requests for modification. The software executing on the computer then performs work package calculations on the modified home plan to generate a modified breakdown.

In one embodiment, the system includes a database having a plurality of home plans stored thereon, and the software executing on the computer for generating a home plan retrieves one of the plurality of home plans stored on the database based on the responses to the transmitted queries. In another embodiment, the software executing on the computer for generating a home plan generates a scope summary based on the received responses to the transmitted queries and generates a home plan based on the scope summary. The queries may relate to a homeowner's lifestyle and fundamental needs, in which case the scope summary comprises a homeowner profile, or the queries may relate to required details of the home plan, in which case the scope summary comprises a home specification.

The system includes software executing on the computer for receiving information necessary to prepare a bankable estimate, and for using the received information and the breakdown to generate and transmit a bankable estimate. In addition, the system includes software executing on the computer for receiving information necessary to prepare an offer, for generating contract documents using the received information, and for using the contract documents and the breakdown to generate and transmit an offer. Preferably, the system also includes software executing on the computer for generating and transmitting offers to goods and services providers for supplies needed and work to be performed, for receiving acceptances of the offers to goods and services providers, and for generating a ratification of a purchase order for each of the offers to goods and service providers for which acceptances are received and for opening a bidding process for each of the offers to goods and service providers for which acceptances are not received.

The system includes software executing on the computer for generating a construction plan, which has a plurality of construction steps and an indication of construction progress, whether each of the steps is ready to occur being dependent on construction progress. The generated construction plan is stored on a construction plan database. The system includes software executing on the computer for periodically examining the construction plan stored on the database, for determining if at least one of the construction steps is ready to occur based upon the indication of construction progress, and for generating and transmitting a notification to goods and services providers if at least one of the construction steps is ready to occur. Software executing on the computer is provided for receiving indications from goods and services providers of changes in the construction progress and for updating the construction plan stored on the database based upon the received indications of changes in construction progress.

Preferably, the system includes a website for retrieving and displaying the home plan stored on the database. The website is accessible by a homeowner, thereby allowing the homeowner to view the home plan and the construction progress at any given time. Most preferably, the system includes a video input device located at the construction site. The video input device transmits images of the construction site to the website so the homeowner can view construction progress.

The invention and its particular features and advantages will become more apparent from the following detailed description considered with reference to the accompanying drawings.

DETAILED DESCRIPTION OF THE INVENTION

Figure 1:
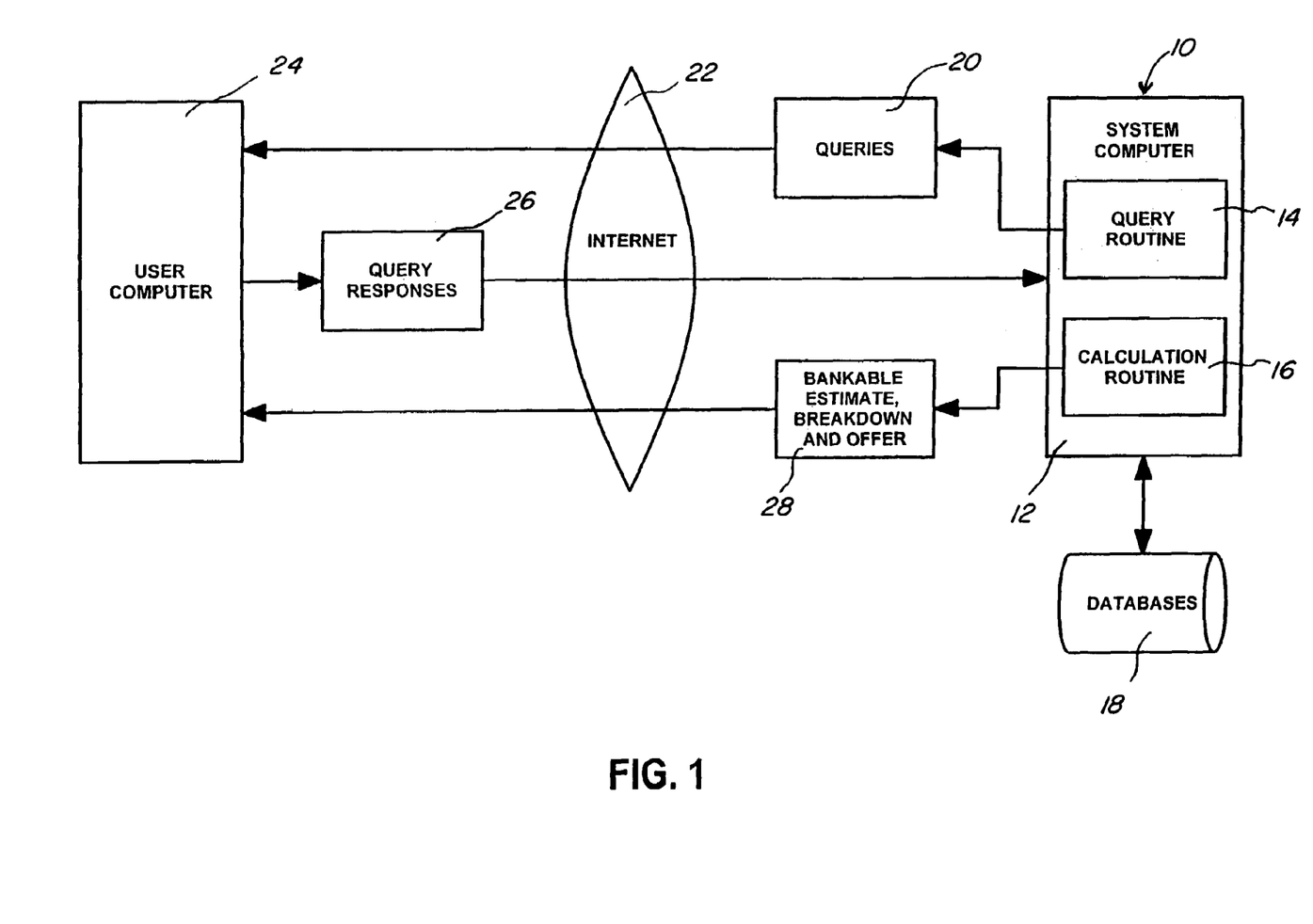
FIG. 1 is a block diagram of a system for providing construction services in accordance with the present invention.

Referring first to FIG. 1, a system 10 for providing construction services in accordance with the present invention is shown in its simplest form. System 10 includes a system computer 12, having query routine software 14 and calculation routine software 16 executing thereon. System 10 may also include one or more databases 18 which may be used by system 10 as described fully below.

Query routine software 14 generates queries 20 pertinent to the design of a home and transmits queries 20 through an internet communication link 22 to a user computer 24. A user operating user computer 24 then views queries 20, composes responses 26 to queries 20, and transmits responses 26 to system computer 12 through internet communication link 22. Calculation routine software 16 uses query responses 26 to calculate a home plan, perform work package calculations to generate a breakdown based on the home plan, and generate various other pertinent documents, such as a bankable estimate and an offer to build. These documents 28 are transmitted back to user computer 24 through internet communication link 22.

It should be understood that by "work package calculations," what is meant is software that categorizes and inventories supply and aggregate prices, and produces comprehensive breakdowns of all components to design and construction using a limited number of input variables.

In most cases the user operating user computer 24 will be a prospective homeowner desiring to have a home designed and constructed. However, it should be understood that others may also use system 10. For example, insurance carriers may use system 10 to catalog and aggregate prices for home construction work, and can obtain guarantees from system 10 toward these prices.

Figure 2:
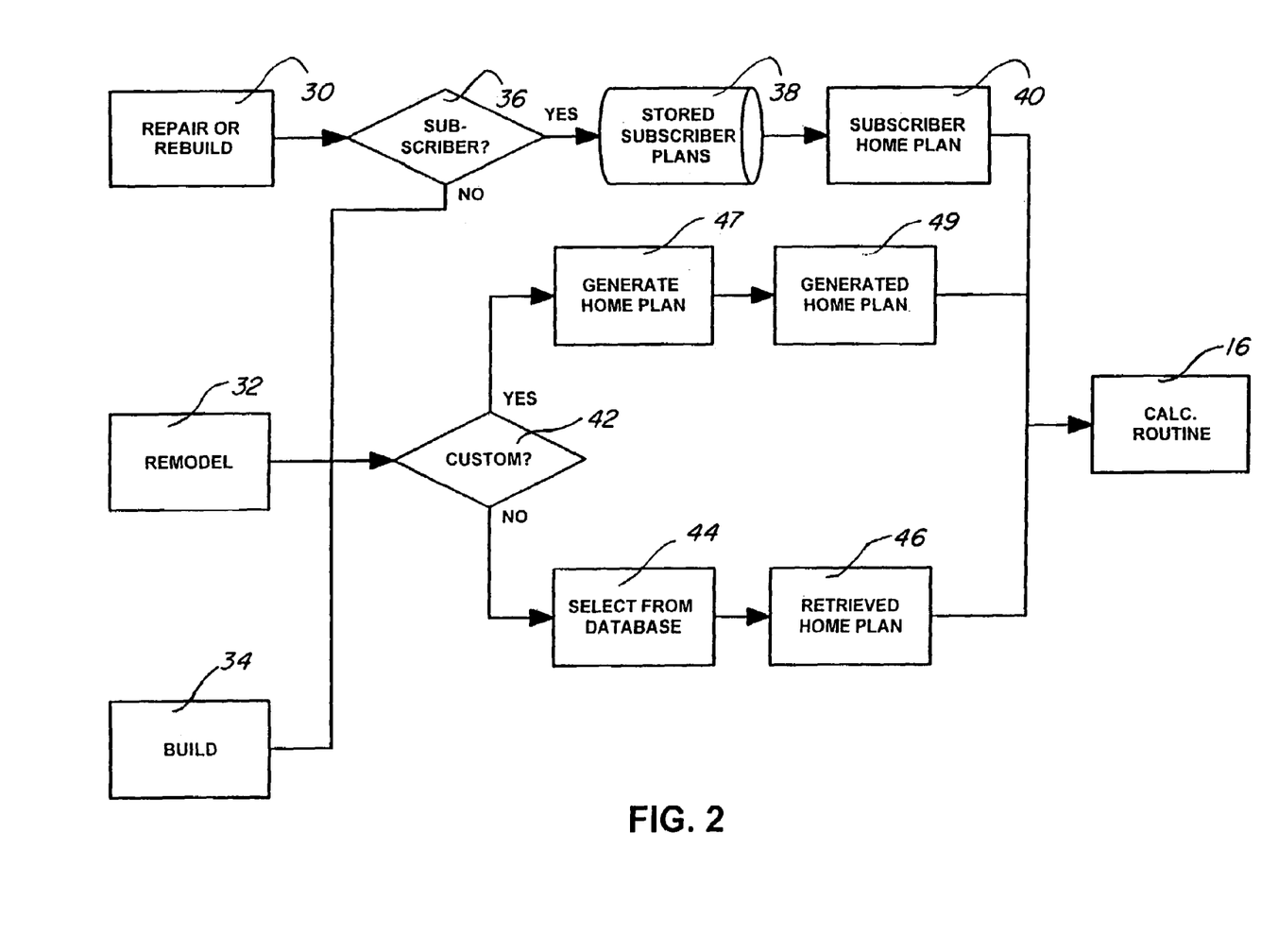
FIG. 2 is a block diagram of a query routine portion of the system for providing construction services of FIG. 1.

Referring now to FIG. 2, operation of query routine software 14 is shown in more detail. Query routine software 14 gives the user the option of selecting to repair or rebuild a home 30, remodel an existing home 32, or build a new home 34.

If the user elects to repair or rebuild a home 30, query routine software 14 determines whether the user is a subscriber (shown at 36), that is, whether the user has used system 10 on a paid basis. Plans of homes designed or constructed using system 10 are stored on a subscriber home plans database 38, which is accessible by query routine software 14. If the user is a subscriber, query routine software 14 retrieves the home plan 40 for the subscriber's home from subscriber plans database 38 and transmits the retrieved subscriber home plan 40 to calculation routine software 16.

If the user has elected to repair or rebuild a home 30 and the user is not a subscriber, or if the user has selected to remodel and existing home 32 or build a new home 34, query routine provides the user with a choice (shown at 42) to design a home or portions of a home either by using a custom query-based model or by selecting a pre-made plan. If the user chooses to select a pre-made plan, the user selects a plan (shown at 44) from a database of stored plans, and the retrieved plan 46 is transmitted to calculation routine software 16. A more detailed explanation of the selection process is presented below and illustrated in FIG. 3. If the user chooses to use a custom query-based model, query routine software 14 generates a home plan based on user responses to queries (shown at 47) and transmits the generated home plan 49 to calculation routine 16. A more detailed explanation of the query-based models is presented below and illustrated in FIG. 4.

Figure 3:
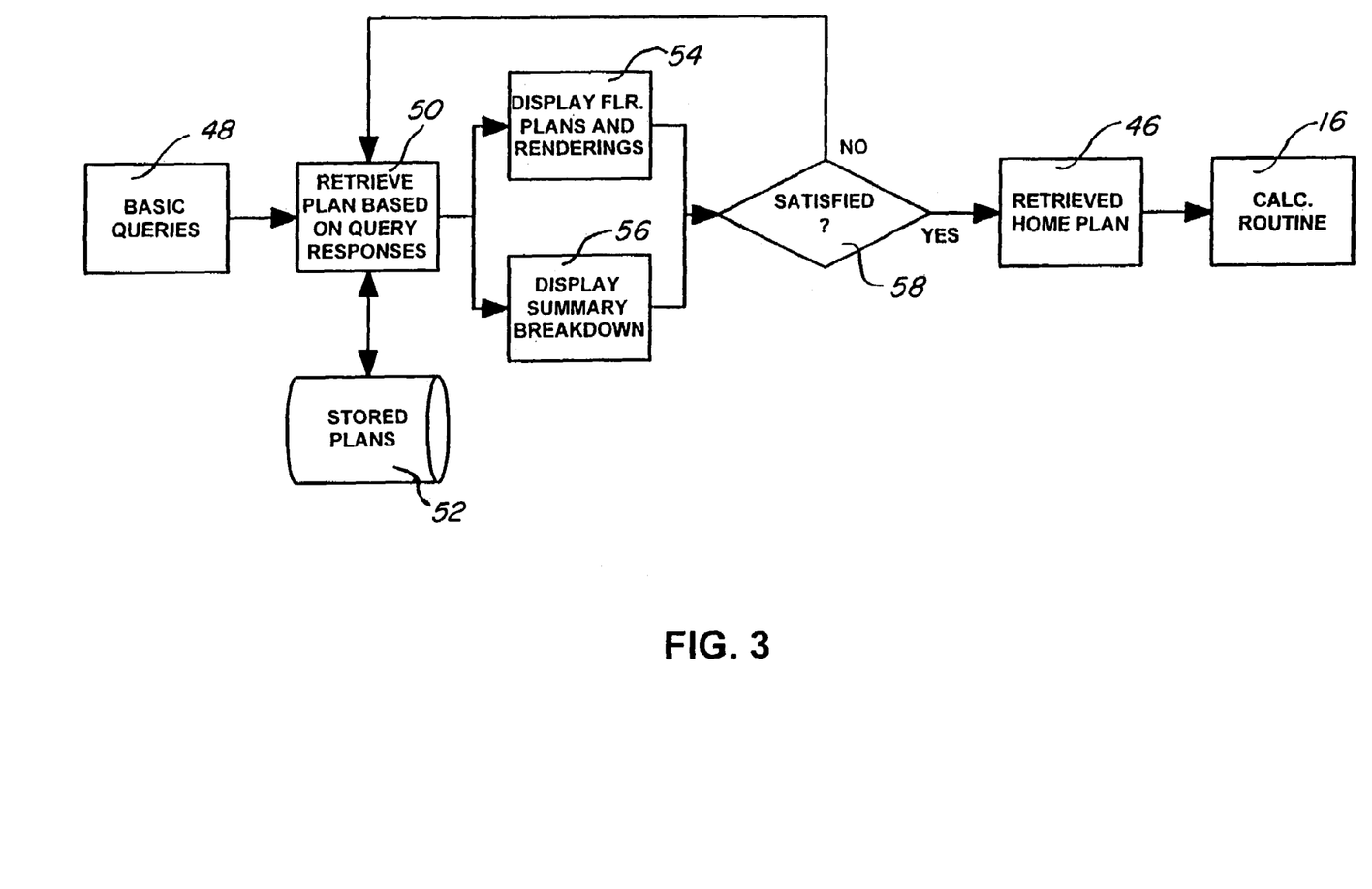
FIG. 3 is a block diagram of a portion of the query routine software of FIG. 2 illustrating the selection of a plan from a database of plans.

Referring now to FIG. 3, when the user chooses to select a pre-made plan, query routine software 14 generates and transmits a series of basic queries 48 to the user, to which the user responds. Basic queries 48 include only the most salient features of a home, for example, the number of square feet, the number of bedrooms, the number of bathrooms, the architectural style, and any required amenities, such as fireplaces, an in-door pool, a sauna, etc. Query routine software 14 compares (shown at 50) the users responses with a plurality of pre-made home plans stored on a plans database 52 to determine which home plans meet the user's criteria. To this end, each of the home plans stored on database 52 includes an indication of salient features in addition to floor plans and renderings 54 and a summary breakdown 56 of labor, materials, equipment, and costs associated with the home plan. For example, if the user specifies a home having 4750 to 5000 square feet, four or more bedrooms, four or more bathrooms, a Colonial style, three or more fireplaces and a sauna, query routine software will determine which plans meet all of these criteria. Query routine software 14 then transmits a display of floor plans and renderings 54 and a summary breakdown 56 to the user. If the user is satisfied (indicated at 58) with the retrieved home plan, the home plan is transmitted to calculation routine 16. If the user is not satisfied with the home plan, query routine software retrieves and displays additional home plans which match the user's criteria until the user is satisfied.

Figure 4:
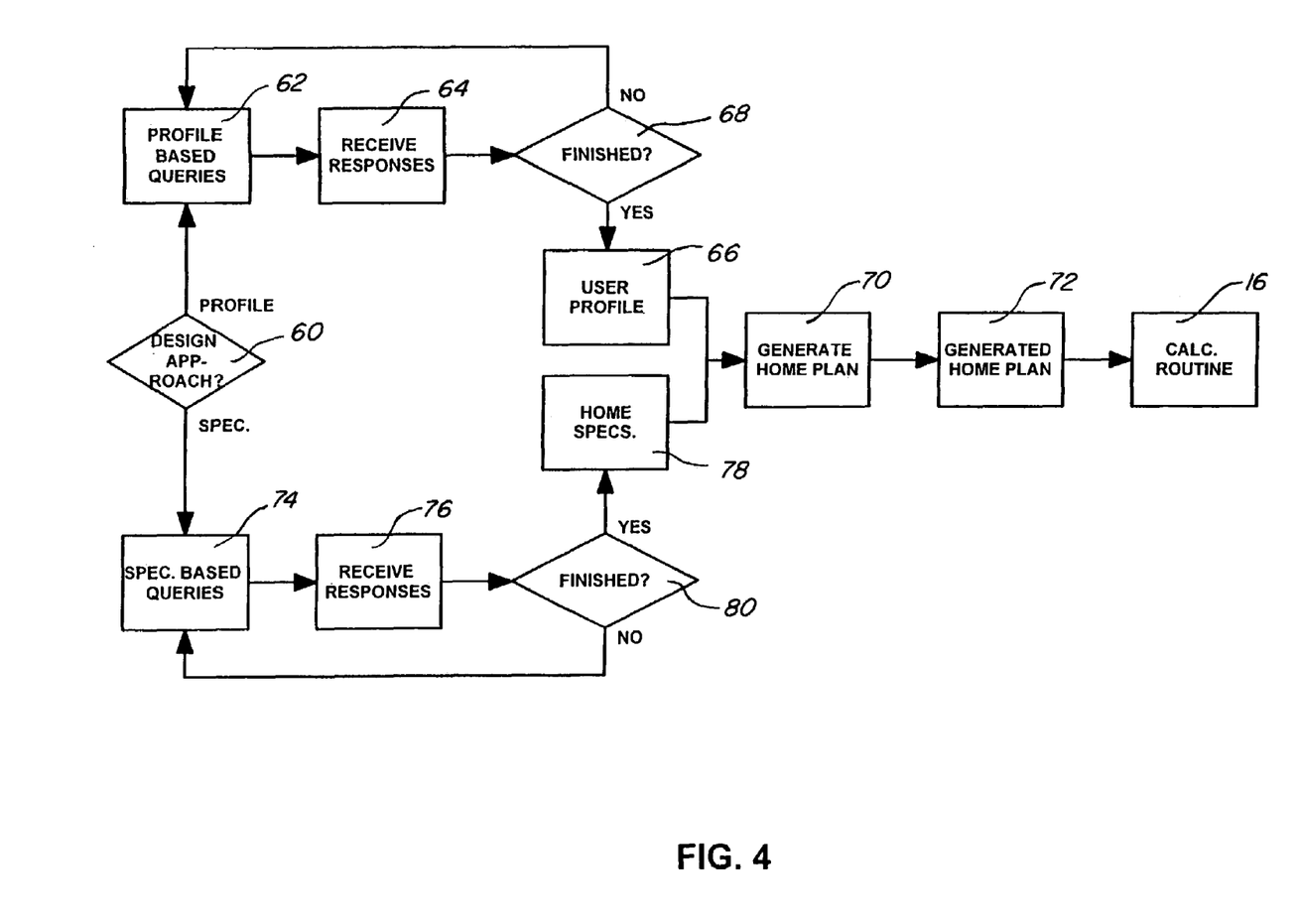
FIG. 4 is a block diagram of a portion of the query routine software of FIG. 2 illustrating the generation of a home plan using query-based models.

Referring now to FIG. 4, when the user chooses to a design a custom home using a query-based model, query routine software 14 may use one of two models selectable by the user (shown at 60), a user profile-based model, or a home specification-based model. When the profile-based model is used, query routine software 14 generates a series of queries 62 based upon the user's lifestyle and personal tastes in a home. Such queries may, for example, relate to the purpose of the home (e.g., retirement home, income generation, vacation home, primary residence), fundamental needs of the family (e.g., age of family members, number of children, number of vehicles), cultural requirements (e.g., worship chamber, special kitchen requirements), business needs (e.g., home office, special electronics or communications), health care needs (e.g., special medical equipment, handicap facilities, air purification), basic architectural style preferences (e.g., Colonial, Tutor, Victorian), social activities (e.g., large parties, formal dinner parties), meal habits (e.g., eat and run, informal family setting, formal setting with servants), children's play habits (e.g., with family or separate room), live-in servants (e.g., au par, butler, maid, grounds keeper), etc. Other queries may relate to amenities and services which are included in the home (e.g., pool, basketball or tennis court, steam room), or available in the area (e.g., country club, horse trainer, private schools).

Query routine software 14 receives responses (shown at 64) to queries 62, and generates a user profile 66. When the user is finished (shown at 68) responding to queries 62, query routine software 14 uses completed user profile 66 to generate at least one home plan (shown at 70) and detailed cost breakdown incorporating design concepts based upon the lifestyle and personal tastes of the user as reflected in user profile 66. Preferably, each home plan also includes floor plans and renderings, and query routine software 14 generates multiple home plans and corresponding detailed cost breakdowns, to give the user a choice of home plans from which to select. Query routine software 14 then transmits the generated home plan 72 to calculation routine 16.

When the specification-based model is used, query routine software 14 generates a series of queries 74 based upon a comprehensive list of features the user requires in a home. Such queries may, for example, relate to the number and types of rooms, the dimensions of each room, building materials, wall and floor finishes of each room, number and types of doors and windows, exterior finish of home, number or car garage, whether garage is detached, and a number of other details. Query routine software 14 receives responses (shown at 76) to queries 74, and generates a list of home specifications 78. When the user is finished (shown at 80) responding to queries 74, query routine software 14 uses the completed list of home specifications 78 to generate a detailed cost breakdown and at least one home plan (shown at 70) incorporating the requirements listed in home specifications 78. Query routine software 14 then transmits the generated home plan 72 to calculation routine 16.

The number of queries 62, 74 which the user is required to answer is minimal. However, it should be understood that the accuracy of the generated home plan 72 is directly proportional to the amount of information provided by the user through queries 62, 74. It should also be understood that the accuracy of the calculations performed by calculation routine 16 for queries 62, 74 are also in some capacity proportional to the number of queries 62, 74 which the user answers.

Figure 5:
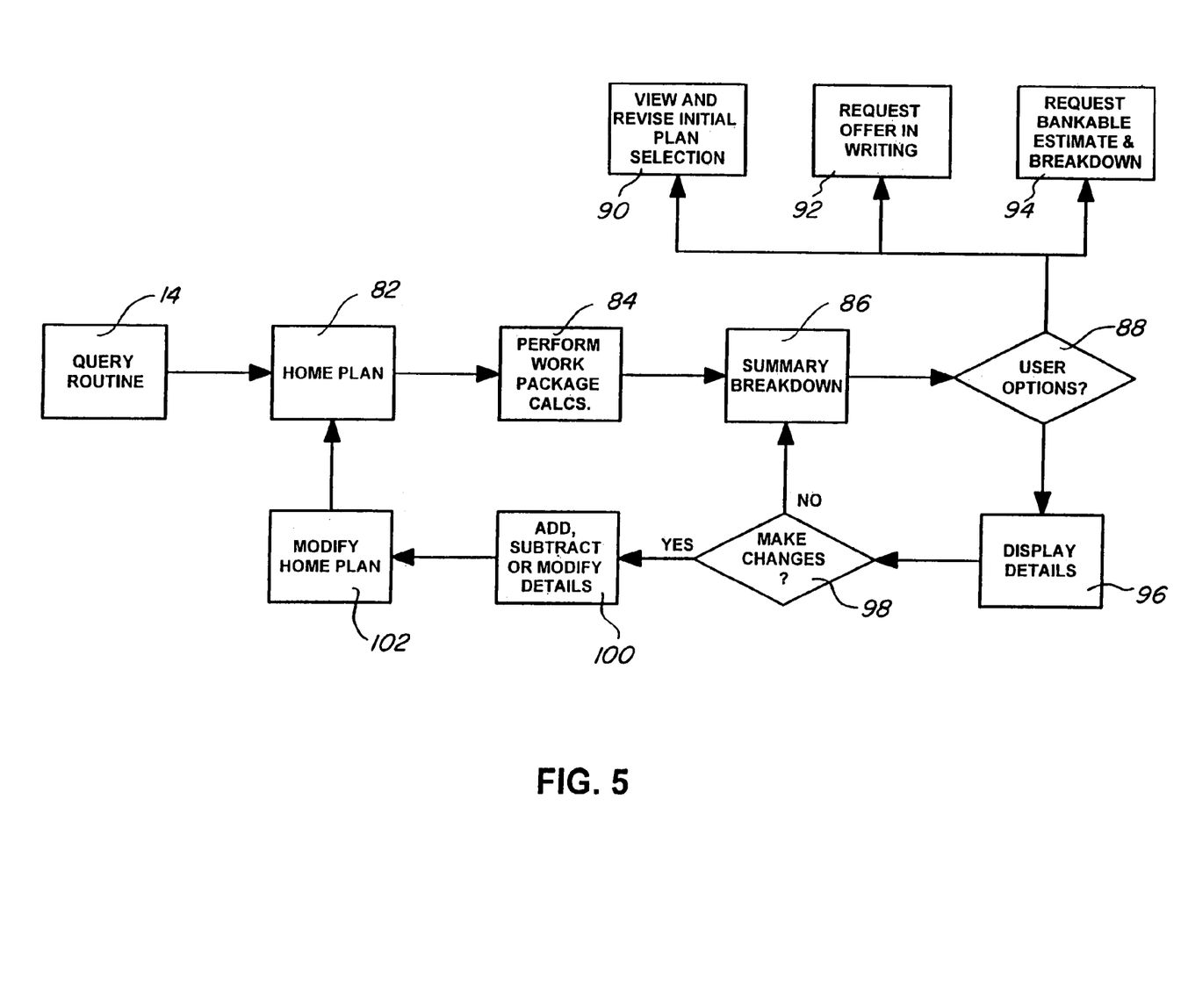
FIG. 5 is a block diagram of a calculation routine portion of the system for providing construction services of FIG. 1.

Referring now to FIG. 5, operation of calculation routine software 16 is shown in more detail. Calculation routine software 16 receives a home plan 82 from query routine 14. Home plan 82 will be a subscriber home plan 40 if the user is repairing or rebuilding a home and the user is a subscriber, a retrieved home plan 46 if the user selected a pre-made plan, or a generated home plan 72 if the user designed a custom home using a query-based model. Calculation routine software 16 performs work package calculations (shown at 84) on the home plan 82 to generate a summary breakdown 86 of labor, material, equipment, and costs associated with the design concept embodied in home plan 82. If home plan 82 is a subscriber home plan 40, the summary breakdown will already have been provided to calculation routine software 16, and work package calculations 84 will not be required. It should be understood that numerous software-based systems for performing work package calculations are known in the art, and that any one of such systems may be used with system 10.

Calculation routine software 16 displays summary breakdown 86 to the user, and allows the user to choose from various options (shown at 88), which may include viewing and revising initial home plan selection 90, requesting a written offer to build the home 92, requesting a bankable estimate and breakdown 94, or displaying the details of the home plan and breakdown 96. If the user chooses to display the details 96, calculation routine software 16 transmits the details to the user, and allows the user to make changes (shown at 98) to the details of the home plan 82. Such details may include such things as brands of materials to be used, carpet selection, finish of fixtures, and similar details which do not require recalculation of the entire home plan. Calculation routine software 16 receives the user's request to add, subtract or modify details 100, and modifies (shown at 102) home plan 82 accordingly. Calculation routine software 16 performs work package calculations (shown at 84) on the now-modified home plan 82 to generate a revised summary breakdown 86, and the user is given the same options 88 as discussed above. Thus, calculation routine software 16 allows for comparative shopping, analysis, and research into each component of the breakdown, and allows modification or substitution of each component with other components such that aggregation of prices and calculations automatically occur.

Figure 6:
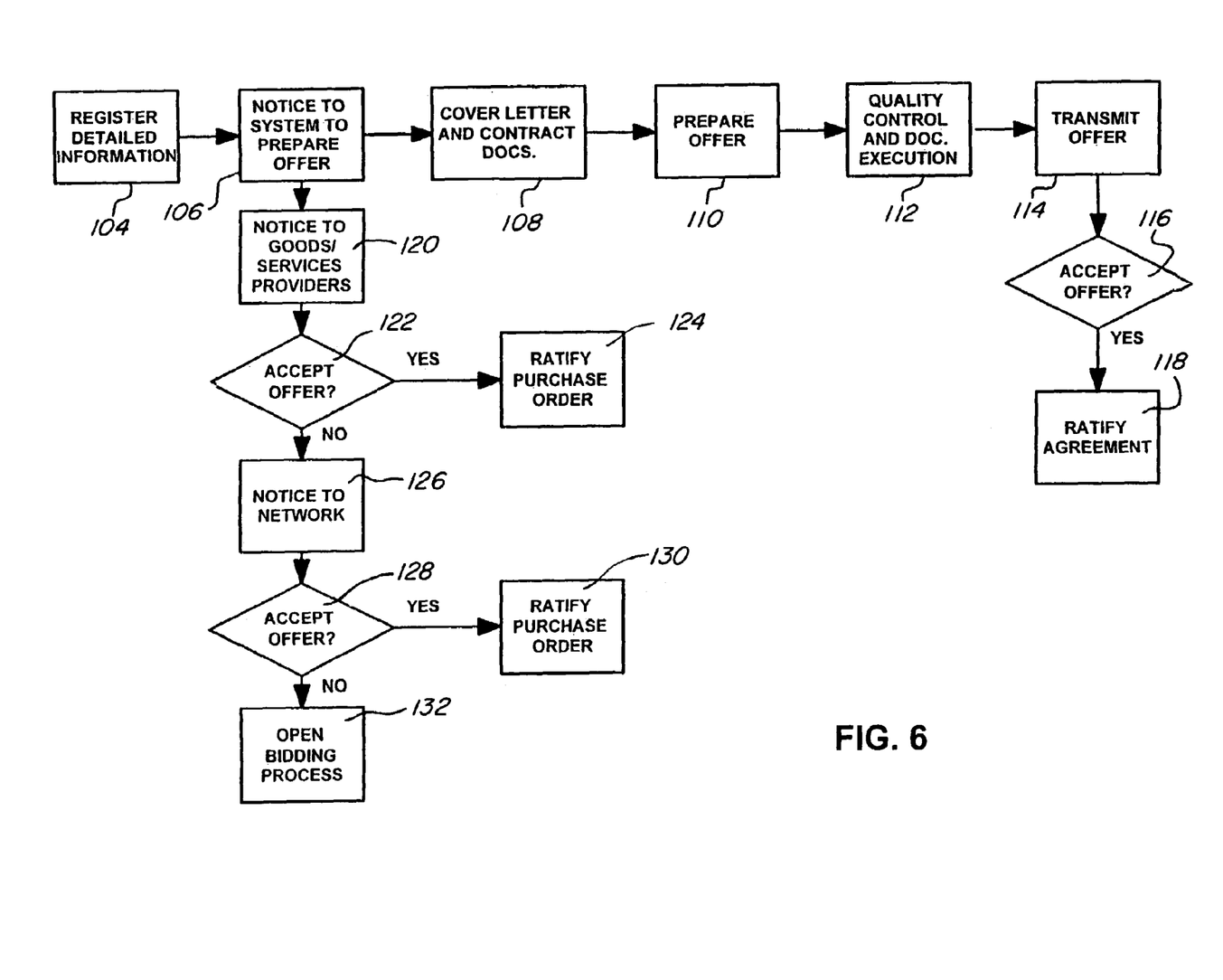
FIG. 6 is a block diagram of a portion of the system for providing construction services of FIG. 1 illustrating generation of a written offer and an offer process for goods and services providers.

Reference is now made to FIG. 6, which details how an offer is prepared in response to a user's request for a written offer 92 and the offer process for goods and services providers, such as manufacturers, distributors, suppliers, contractors, consultants and designers. When a request for a written offer 92 is received, system 10 requires the user to register detailed information 104 necessary to prepare the offer and contract documents. When this information is received, system 10 generates a notice to the system to prepare an offer 106. System 10 uses the detailed information 104 supplied by the user and the breakdown 86 to generate a cover letter, contract documents, and other documents required by state law 108, which are in turn assembled, together with the breakdown 86, to generate an offer 110. At this stage, human intervention is required because state law requires that licensed professional designers (e.g. architects and engineers) develop design documents in accordance with state and local codes in order to build a plan. The final product of a design process normally consists of plan drawings and detailed specifications that are approved and stamped by the professional responsible for the design documents. Thus, human intervention is required to execute any documents required by state law, as well as to perform quality control functions (shown at 112).

The offer is then transmitted 114 to the user. If the offer is accepted by the user 116, system 10 ratifies the agreement 118 which has been formed by the offer and acceptance of the offer.

When system 10 receives the notice to prepare the offer 106, system 10 also generates a notice to preferred goods and services providers 120 offering contracts for goods and services that will be required for construction according to the home plan 82. For the goods and services for which the offers are accepted at 122, system 10 generates and transmits a notice 124 ratifying the purchase order created by the offer and acceptance. For the goods and services for which the offers are not accepted at 122, system 10 generates and transmits a notice 126 to a network of goods and services providers offering contracts for the goods and services needed. For the goods and services for which the offers are accepted at 128, system 10 generates and transmits a notice 130 ratifying the purchase order created by the offer and acceptance. For the goods and services for which the offers are not accepted at 128, system 10 generates a notice 132 for commencement of an open bidding process to the general market for goods and services that require human intervention.

Figure 7:
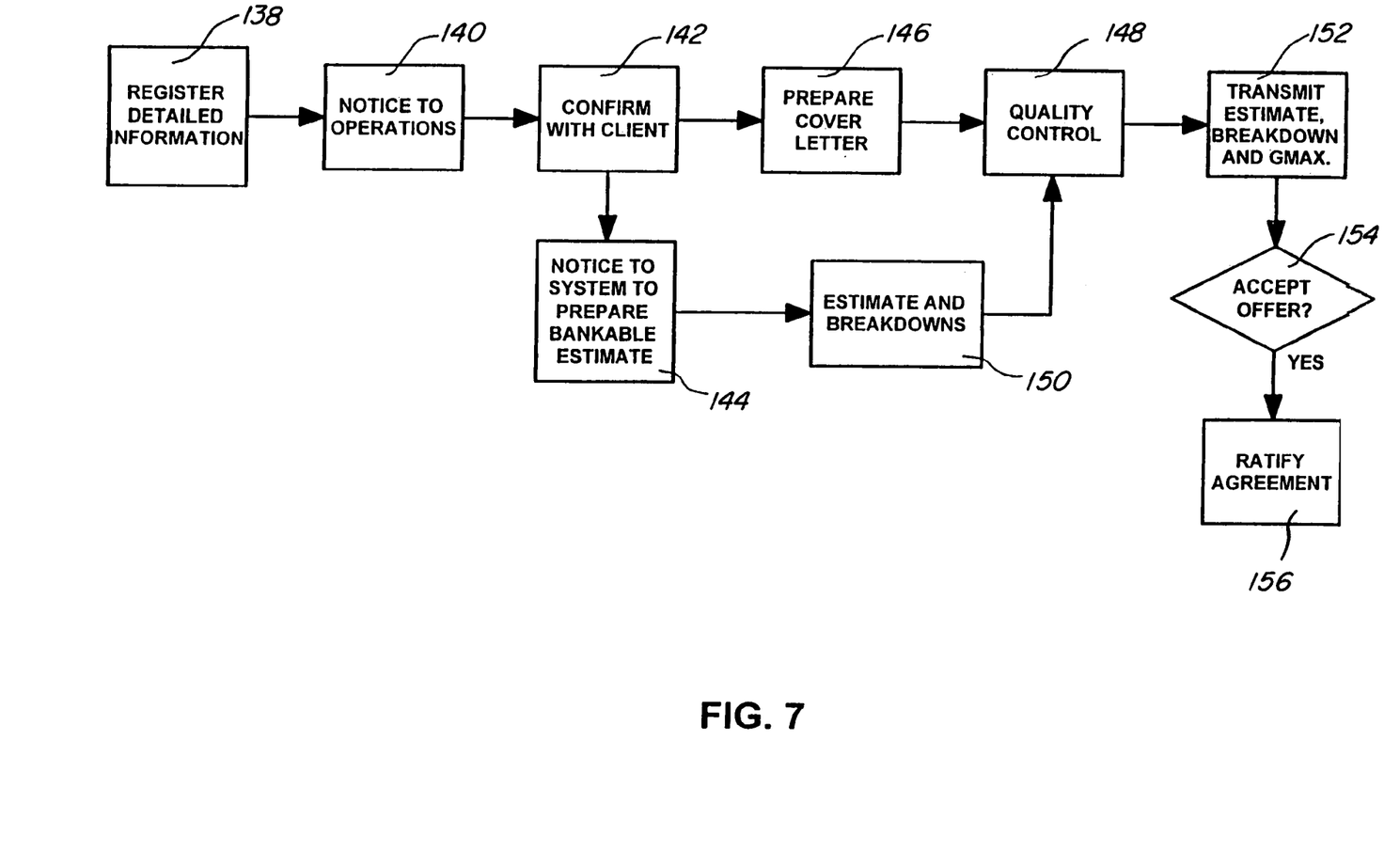
FIG. 7 is a block diagram of a portion of the system for providing construction services of FIG. 1 illustrating generation of a bankable estimate and a guaranteed maximum price.

Reference is now made to FIG. 7, which details how a bankable estimate and guaranteed maximum price are prepared in response to a user's request for a bankable estimate 94. When a request for a bankable estimate 94 is received, system 10 requires the user to register detailed information 138 necessary to prepare the bankable estimate and guaranteed maximum price. When this information is received, system 10 generates a notice 140 to an employee, typically but not necessarily in the operations department, to prepare a bankable estimate and guaranteed maximum price. The employee confirms the bankable estimate request with the user 142, and upon confirmation generates a notice 144 to system 10 to prepare the bankable estimate. The employee also will typically generate a cover letter 146 and other required documents and forward these documents to an employee typically in quality control 148. As should be obvious, the employee in operations and the employee in quality control 148 may be the same person. Upon receiving the notice 144 to prepare the offer, system 10 uses the detailed information 138 supplied by the user, and the breakdown 86 to prepare an estimate, which is transmitted 150, along with the breakdown 86, to quality control 148. At this point, the employee in quality control 148 prepares the bankable estimate and guaranteed maximum price by assembling the employee-prepared documents with the documents prepared by system 10, and the bankable estimate, breakdown and guaranteed maximum price are transmitted 152 either by the employee or by system 10 to the user in legal form and in accordance with state law. If the offer for goods and services contained within the bankable estimate is accepted by the user 154, either the employee or system 10 ratifies the agreement 156 which has been formed by the offer and acceptance of the offer.

Figure 8:
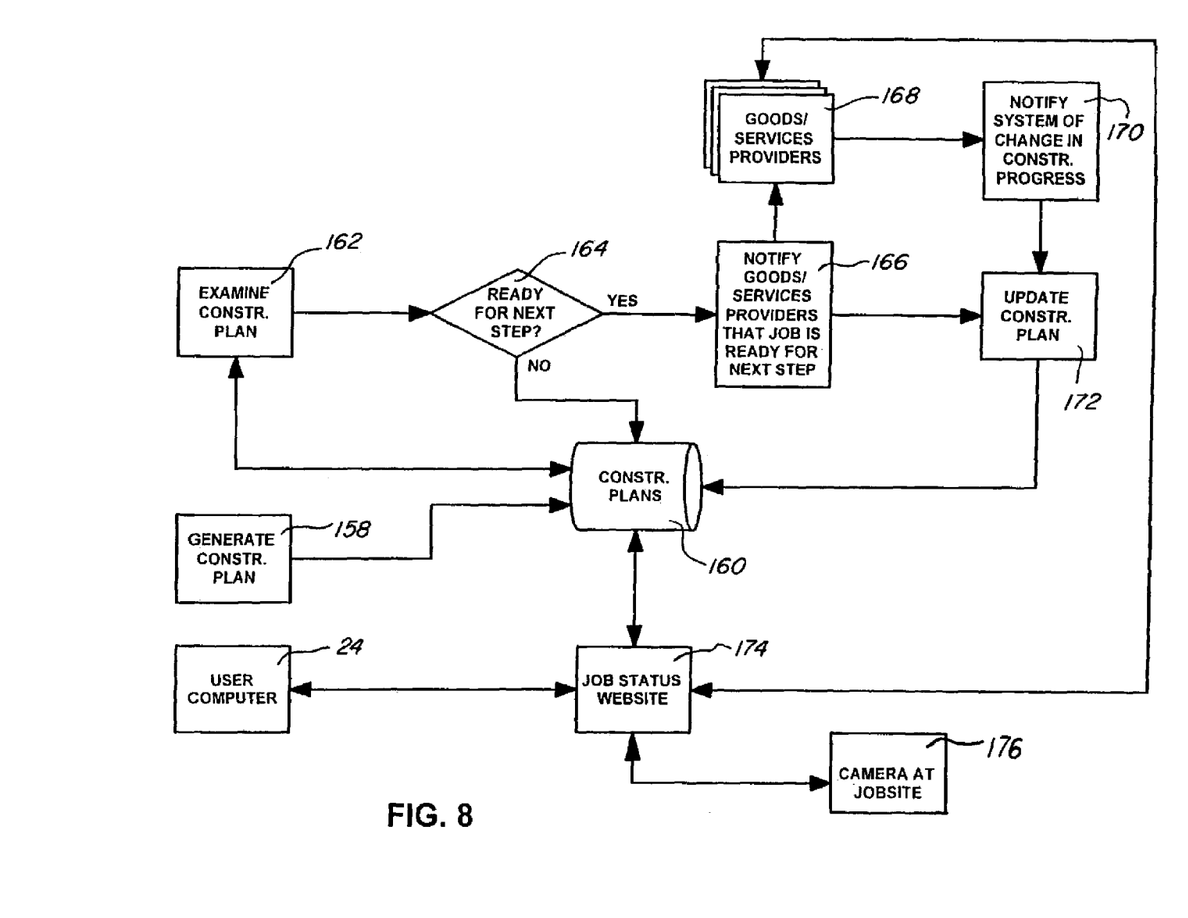
FIG. 8 is a block diagram of a portion of the system for providing construction services of FIG. 1 illustrating a construction management aspect of the system.

Referring now to FIG. 8, a construction management aspect of system 10 is shown. Once an offer to build a home is accepted, system 10 generates a construction plan, which comprises a series of steps which have triggering events dependent on construction progress. For example, one of the steps may call for framing the home, which step cannot be performed until the foundation is completed. Another step may be for carpets to be installed, which step may be dependent upon the completion of interior painting and electrical systems, for example. The construction plan also includes an indication of the current construction progress, that is, the status of each of the steps (i.e., to what extent each step has been completed). The generated construction plan 158 is stored on a construction plans database 160, which may also include construction plans for other jobs in progress. System 10 periodically retrieves and examines the construction plan 162 from construction plans database 160 to determine if the job is ready for commencement of the next step 164. System 10 may perform the examining step 162 at time-based intervals, for example, once a day, or may perform the examining step when a change is made to the indication of construction progress.

If the job is ready for commencement of a step, system 10 generates and transmits a notice 166 to goods and services providers 168 notifying them of such. When goods and services providers 168 have made progress on, or completed, a step, the providers 168 notify system 10 of such changes in construction progress 170, and system 10 uses such information to update the indication of construction progress portion of the construction plan 172 stored on construction plans database 160. Thus, when the construction plan is again examined 162, system 10 may predict that future steps are imminent and notify goods and services providers 168 of planned start dates, aggregation of prices, and the updated indication of construction progress.

System 10 also preferably includes a job status website 174 which is accessible by the user through user computer 24. Construction plans database 160 is accessible by job status website 174 so that website 174 can retrieve the construction plan from database 160, thereby allowing the user to view the construction plan and the indication of construction progress when desired. Thus, the user may always know the status of the job. Preferably, website 174 is also accessible by goods and services providers 168 and allows providers 168 to post information on website 174 so that system 10 allows the user to research, learn about, analyze, evaluate, interview and select goods and services providers both before construction commences and while construction is proceeding. Most preferably, system 10 also includes a video input device 176, such as a digital camera, located at the construction site which transmits images of the construction site to job status website 174 so that the user and goods and services providers 168 can view the status of the job.

Figure 9:
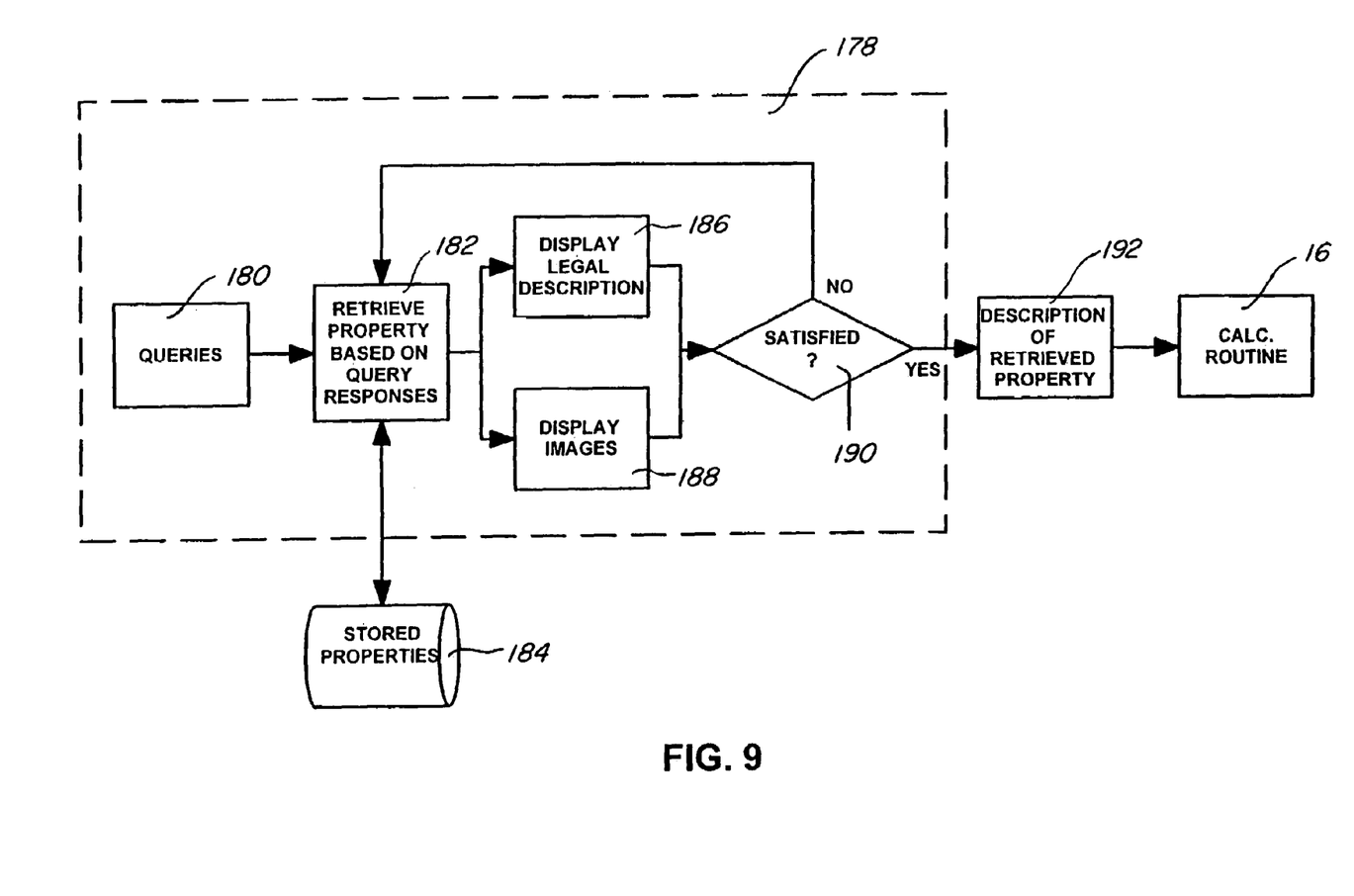
FIG. 9 is a block diagram of a property selection routine which may be incorporated into the system for providing construction services of FIG. 1.

Referring now to FIG. 9, system 10 preferably includes property selection routine software 178 executing on computer 12 for allowing a user to select a property on which to have a house constructed. Property selection routine software 178 generates and transmits a series of queries 180 to the user, to which the user responds. Queries 180 may be directed to the specifications of a lot on which, or of a community in which, the user wishes to construct a home, and may include queries 180 relating to such specifications as the property location, the property size, the property attributes (i.e., beachfront, lakefront, wooded, hills, etc.), services available in the area of the property (i.e., day care, country clubs, private schools, etc.), and other salient information. When such information has already been provided as part of queries 62, 74, the salient information can be extracted therefrom by property routine selection software 178, and separate queries 180 are not required. Property selection routine software 178 compares (shown at 182) the users responses with a plurality of properties stored on a properties database 184 accessible by computer 12 to determine which properties meet the user's criteria, and retrieves a description of each matching property. To this end, each of the properties stored on database 184 includes an indication of salient features. Property selection routine software 178 then transmits a legal description 186 and relevant images 188 (i.e., maps of the property, photographs of the property, etc.) of each matching property to the user. If the user is satisfied (indicated at 190) with the retrieved property, a description of the retrieved property 192 is transmitted to calculation routine 16 to be used in performing work package calculations and detailed breakdowns. If the user is not satisfied with the property, property selection routine software 178 retrieves and displays additional properties which match the user's criteria until the user is satisfied. Preferably, property selection routine software 178 retrieves and transmits legal descriptions 186 and relevant images 188 of multiple properties to give the user a choice of properties from which to select.

Figure 10:
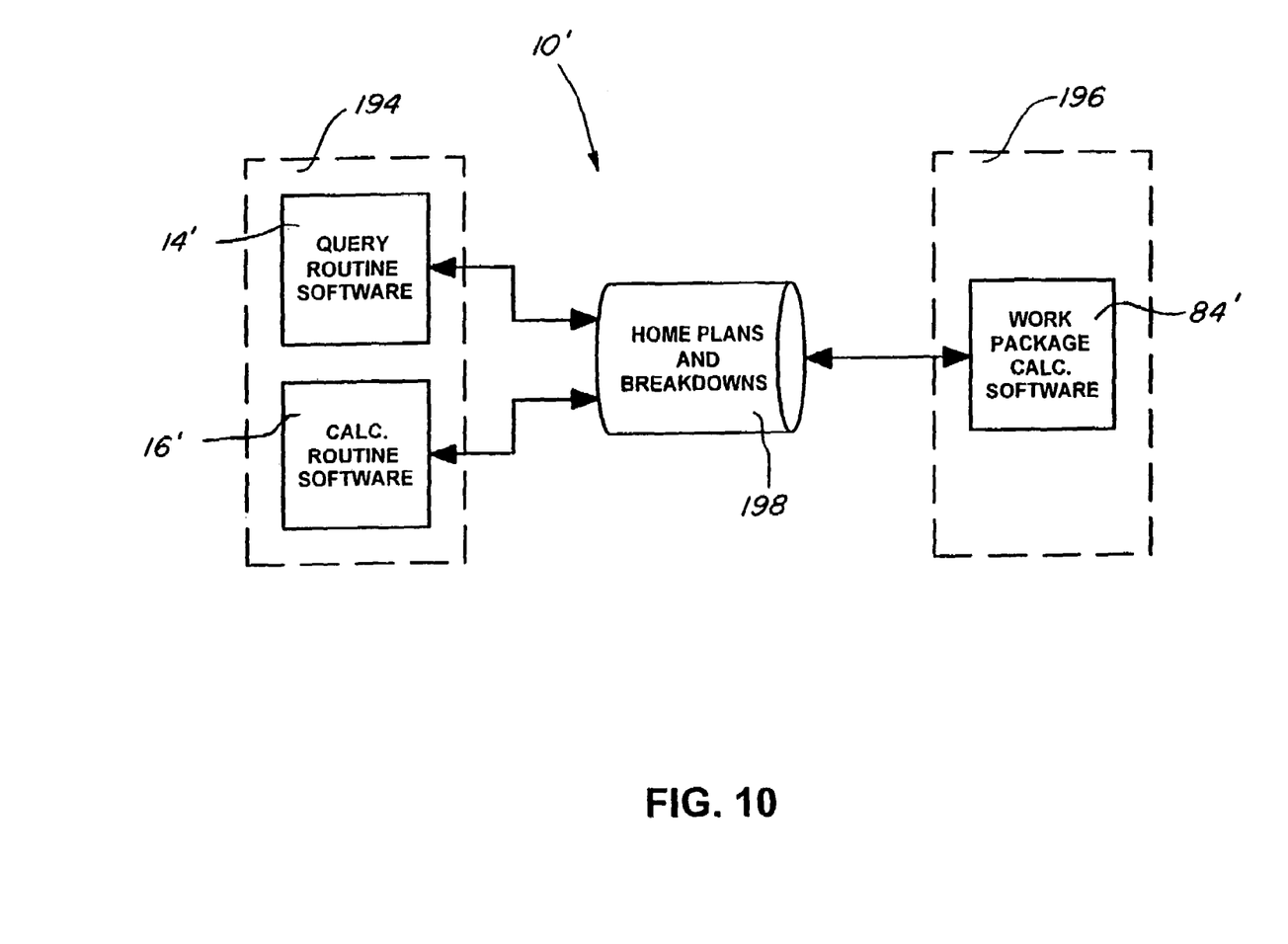
FIG. 10 is a block diagram of an embodiment of the system for providing construction services of FIG. 1 incorporating security provisions to protect proprietary software.

Referring now to FIG. 10, an embodiment of the system 10' of the present invention may incorporate two or more separate computers, instead of one computer 12. Such may be desirable, for example, when proprietary software and algorithms are used with system 10'. System 10' includes a web server 194 accessible to users via the internet or otherwise as described above with respect to computer 12, and an application server 196, which is not connected to the internet. Non-sensitive or non-proprietary software, for example query routine software 14' and calculation routine software 16', may be executing on web server 194, while proprietary software, for example work package calculation software 84', may be executing on application server 196. Home plans, breakdowns, and other necessary information may be passed between query routine software 14', calculation routine software 16', and work package calculation software 84' by storing this information on a database 198 accessible by both web server 194 and application server 196, which information after being stored by one software program can then be retrieved by another software program. For example, a home plan may be generated by query routine software 14', stored on database 198, and retrieved by work package calculation software 84'. Work package calculation software may then use the retrieved home plan to generate breakdowns and store the generated breakdowns on database 198. The stored breakdowns may then be retrieved by calculation routine software 16' for further processing. In this manner, work package calculation software 84' remains isolated from the internet, and is therefore not easily accessible by the general public. It should be understood that other programs or portions thereof, may also be executing on application server 196 when such other programs or portions thereof are proprietary.

The present invention, therefore, provides a system which reduces the time and cost required to conceive, plan and program, inventory and categorize supply for, design, budget and aggregate prices for, and produce documents and information essential for, the construction, remodeling, repair or reconstruction of a home, which automates much of the labor required to conceive, plan and program, inventory and categorize supply for, design, budget and aggregate prices for, and produce documents and information essential for, the construction, remodeling, repair or reconstruction of a home, which allows homeowners to research and interact with consultants, designers, builders and contractors of homes, and which provides for automated and efficient management of the construction, remodeling, repair or reconstruction of a home.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for providing construction services comprising:
   a computer;
   software executing on said computer for creating a construction plan, the construction plan having a plurality of construction steps and an indication of construction progress, whether each of the steps is ready to occur being dependent on construction progress;
   a construction plan database having the created construction plan stored thereon;
   software executing on said computer for periodically examining the construction plan stored on said database, for determining if at least one of the construction steps is ready to occur based upon the indication of construction progress, and for creating and transmitting a notification to goods and services providers if at least one of the construction steps is ready to occur; and
   software executing on said computer for receiving indications from goods and services providers of changes in the construction progress and for updating the construction plan stored on said database based upon the received indications of changes in construction progress.

2. The system for providing construction services of claim 1 further comprising a website for retrieving and displaying the home plan stored on said database, said website accessible by a user, thereby allowing the user to view the home plan and the construction progress.

3. The system for providing construction services of claim 2 wherein the construction steps take place at a construction site and further comprising a video input device located at the construction site, said video input device transmitting images of the construction site to said website.

* * * * *